US010341509B2

(12) United States Patent
Kawach et al.

(10) Patent No.: US 10,341,509 B2
(45) Date of Patent: Jul. 2, 2019

(54) CLIENT DEVICE STATE COLLECTION AND NETWORK-BASED PROCESSING SOLUTION

(71) Applicant: Qualys, Inc., Foster City, CA (US)

(72) Inventors: Rami Kawach, Bellevue, WA (US); Terry K. Cook, Monroe, WA (US); Roger W. Sprague, Jr., Kirkland, WA (US); Patrick J. Stratton, Redmond, WA (US)

(73) Assignee: Qualys, Inc., Foster City, CA (US)

( * ) Notice: Subject to any disclaimer, the term of this patent is extended or adjusted under 35 U.S.C. 154(b) by 401 days.

(21) Appl. No.: 13/836,240

(22) Filed: Mar. 15, 2013

(65) Prior Publication Data

US 2014/0268245 A1 Sep. 18, 2014
US 2015/0222765 A9 Aug. 6, 2015

Related U.S. Application Data (60) Provisional application No. 61/768,493, filed on Feb. 24, 2013.

(51) Int. Cl.
G06F 7/00 (2006.01)
G06F 15/16 (2006.01)
H04N 1/00 (2006.01)
H04N 1/21 (2006.01)

(52) U.S. Cl.
CPC ........... *H04N 1/00244* (2013.01); *H04N 1/21* (2013.01)

(58) Field of Classification Search
CPC ..................... H04N 1/21; H04N 1/00244

USPC ........................................ 709/224
See application file for complete search history.

(56) References Cited

U.S. PATENT DOCUMENTS

| | | | | |
|---|---|---|---|---|
| 6,202,085 B1* | 3/2001 | Benson | ............ | G06F 17/30008 707/E17.007 |
| 6,205,552 B1* | 3/2001 | Fudge | ................. | H04L 63/1425 726/25 |
| 6,725,281 B1* | 4/2004 | Zintel | ................. | H04L 12/2803 709/217 |
| 8,161,163 B2* | 4/2012 | Hunt | ...................... | G06F 9/546 709/203 |
| 8,676,914 B2* | 3/2014 | Ragunathan | ............ | G06F 15/16 709/205 |
| 9,367,680 B2* | 6/2016 | Mahaffey | .............. | G06F 21/564 |
| 2002/0169740 A1* | 11/2002 | Korn | ................. | G06F 17/30162 |
| 2005/0119996 A1* | 6/2005 | Ohata | ................. | G06F 11/3495 |
| 2007/0226807 A1* | 9/2007 | Ginter | ..................... | G06F 21/10 726/27 |
| 2008/0215713 A1* | 9/2008 | Cannon | ................... | H04L 29/06 709/221 |
| 2010/0118114 A1* | 5/2010 | Hosseini | ................ | H04N 7/148 348/14.09 |
| 2011/0252138 A1* | 10/2011 | Ahuja | .................. | G06F 17/3089 709/226 |

(Continued)

*Primary Examiner* — Anthony Mejia
*Assistant Examiner* — Golam Mahmud
(74) *Attorney, Agent, or Firm* — Baker & McKenzie LLP (57) ABSTRACT

The presently described embodiments relate to a novel system and method to collect state as a snapshot from a potentially transient endpoint and transmit the state to a public or private network for storage and processing. This system and method allows for the synchronization and virtualization of the endpoint state image in the network for purposes of processing, analysis, and reporting, including but not limited to endpoint vulnerability auditing.

19 Claims, 3 Drawing Sheets

(56) References Cited

U.S. PATENT DOCUMENTS

| | | | |
|---|---|---|---|
| 2012/0011173 A1* | 1/2012 | Ohata | G06F 11/3495 707/812 |
| 2012/0137095 A1* | 5/2012 | Grube | G06F 12/0638 711/162 |
| 2013/0097710 A1* | 4/2013 | Basavapatna | H04W 4/02 726/25 |
| 2013/0191332 A1* | 7/2013 | Wyatt | G06F 17/30578 707/610 |
| 2013/0212161 A1* | 8/2013 | Ben-Shaul | G06F 9/4451 709/203 |
| 2013/0212381 A1* | 8/2013 | Bousamra | H04L 63/0823 713/156 |
| 2013/0232109 A1* | 9/2013 | Deffler | G06F 17/30578 707/616 |

* cited by examiner

CLIENT DEVICE STATE COLLECTION AND NETWORK-BASED PROCESSING SOLUTION

RELATED APPLICATION

This application claims the benefit of U.S. Provisional Application No. 61/768,493, filed Feb. 24, 2013, titled "Client device state collection and network-based processing solution," which is hereby incorporated by reference.

FIELD OF THE INVENTION

The presently described embodiments relate to a data collection and synchronization system and methods for collecting endpoint state and analyzing endpoint state in a network. The presently described embodiments disclose a vulnerability processing system and method that provides advantages over previously known solutions.

BACKGROUND OF THE INVENTION

Currently deployed systems for analysis, scanning and auditing of endpoints have issues whether they are based on local endpoint scanning (agent-based) or remote endpoint scanning via a dedicated appliance (agentless). Currently deployed systems have issues with redundant endpoint state requests, endpoint connectivity failure to a server or network, endpoint communication latency if scanned remotely, endpoint resource pressure when being scanned either locally or remotely, endpoint scanning software update management, single point of failure if using a scanning device, overall endpoint state freshness due to network overhead and scanning device overhead combined with concurrency limits of the scanning device. The system and method described herein introduces novel methods to address all of these issues.

SUMMARY OF THE INVENTION

The technology described herein provides a novel system and method for collecting endpoint state and sending it to a network where the endpoint may have intermittent connectivity to the network due to the nature of the form factor or network conditions of the endpoint. Laptops and mobile devices can more readily be managed and monitored using this methodology. To facilitate this methodology, communication is initiated by the endpoint when the endpoint achieves network connectivity and discovers network/server availability.

In the disclosed system, a superset of state needed for the state rules that are processed in the network is collected from an endpoint, which eliminates the need to propagate state rules to agent-based scanners or remote scanning appliances used in currently deployed systems. The data is collected in passes where a high priority state is collected specifically and at a high frequency and lower priority state is collected in a more generic fashion and at a lower frequency, and data collection is prioritized using a manifest. A manifest may be a set of directions or rules specifying what information is to be collected and at what priority and frequency. For example, priority may mean the order in which groups of state collection rules are processed, or it could mean the order in which applications or device memory areas are processed. Deltas, which represent changes made to the state image since the previous data gathering event, are used to keep the endpoint state in sync with the virtualized image of the endpoint state stored in the network. The state data image is represented as a hash value on the endpoint to reduce impact on the endpoint. These and other refinements provide various advantages over currently deployed systems and methods. Further refinements and novel solutions in the endpoint to network processes, storage and communications are described herein.

BRIEF DESCRIPTION OF THE DRAWINGS

Reference is now made to the following detailed description of the preferred embodiments, taken in conjunction with the accompanying drawings. It is emphasized that various features may not be drawn to scale. In fact, the dimensions of various features may be arbitrarily increased or reduced for clarity of discussion. In addition, it is emphasized that some components be omitted in certain figures for clarity of discussion. Reference is now made to the following descriptions taken in conjunction with the accompanying drawings, in which.

These exemplary figures and embodiments are to provide a written, detailed description of the inventions set forth by any claims that issue from the present application. These exemplary figures and embodiments should not be used to limit the any claims that ultimately issue in a patent from the present application.

These exemplary figures and embodiments are to provide a written, detailed description of the inventions set forth by any claims that issue from the present application. These exemplary figures and embodiments should not be used to limit any claims that ultimately issue in a patent from the present application.

DETAILED DESCRIPTION

The technology described herein provides systems and methods for collecting endpoint state and sending it to a network where the endpoint may have intermittent connectivity to the network due to the nature of the form factor or network conditions of the endpoint. Laptops and mobile devices can more readily be managed and monitored using this methodology. To facilitate this methodology, communication is initiated by the endpoint when the endpoint achieves network connectivity and discovers network availability. Further refinements and solutions in the endpoint-to-network processes, storage and communication are described herein.

Figure 1:
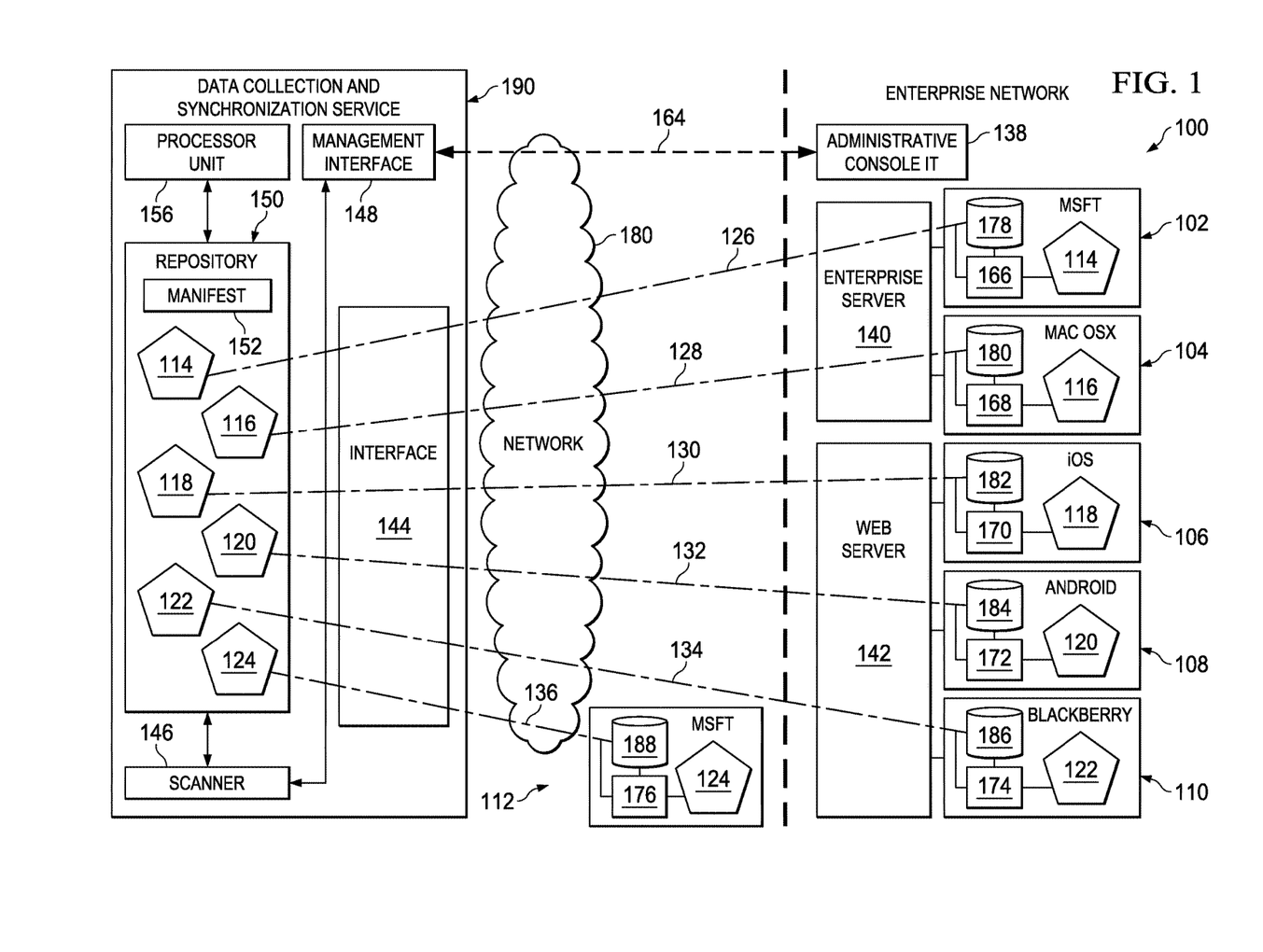
FIG. 1 illustrates a block diagram of an embodiment of a system constructed in accordance with the disclosed principles.

FIG. 1 illustrates a high-level block diagram of an embodiment of a system constructed in accordance with the disclosed principles. In the illustrated embodiment, the system includes a data collection and synchronization service 190 connected to endpoints 102-112 through a network 180. An endpoint 102-112 can be any device with a network interface, which includes, but is not limited to, mobile devices, laptops, or communication paths to other devices. Network 180 may represent any form of communication network between connected machines and any other network elements, and may also represent a collection of machines or virtual machines operable to provide cloud computing services to users. Network 180 may include a public cloud or a private cloud. Network 180 can include routers, hubs, switches, firewalls, content switches, gateways, call controllers, and/or any other suitable components in any suitable form or arrangement. Network 180 can include, in whole or in part, one or more secured and/or encrypted Virtual Private Networks (VPNs) operable to couple one or more network elements together by operating or communicating over elements of a public or external communication network. In general, network 180 can include any combination of public or private communication equipment such as elements of the public switched telephone network (PSTN), a global computer network such as the internet, an intranet, a local area network (LAN), a wide area network (WAN), or other appropriate communication equipment.

The data collection and synchronization service 190 may comprise a network interface 144, a scanner 146, a management interface 148, a repository 150, and a processor unit 156. Network interface 144 provides an interface for communication with endpoints 102-112. Scanner 146 scans the repository 150 for vulnerabilities and other notifiable changes. Scanner 146 communicates these notifications to management interface 148, and management interface 148 communicates these notifications to administrative console IT 138 through a secure, encrypted connection 164.

In the illustrated embodiment, endpoints 102, 104, 106, 108, 110 are within an enterprise network protected by a firewall. Endpoints 102, 104, 106, 108, and 110 may comprise: state images 114, 116, 118, 120, and 122, respectively; analyzing agents 166, 168, 170, 172, and 174, respectively; and databases 178, 180, 182, 184, and 186, respectively. As examples, endpoint 102 may operate on a Microsoft operating system and endpoint 104 may operate on a Macintosh operating system. Endpoints 102, 104 are connected to enterprise server 140 within the enterprise network. Endpoint 106 may run on an iOS (iPhone, iPad) mobile operating system, endpoint 108 may run on an Android operating system, and endpoint 110 may run on a BlackBerry operating system. Endpoints 106-110 are connected to web server 142 within the enterprise network. Endpoint 112 is outside of the enterprise network but is still connected to the network 180. Endpoint 112 may comprise state image 124, analyzing agent 176, and database 188. While the above references particular operating systems, the disclosed embodiments could work with any number of presently known or later-developed operating systems without limitation.

Endpoints 102-112 may each have an analyzing agent 166-176, respectively. The analyzing agent 166-176 should be understood to refer to a general operating software agent of any kind and not specifically tied to any specific product or software agent later developed by applicant. Each analyzing agent 166-176 may be a particular software agent or application programming interface (API) and may further act as a unique identifier for the respective endpoint 102-112 on which it resides. When analyzing agent 166-176 is installed on an endpoint 102-112, there may be one or more identifiers associated with the analyzing agent 166-176. The identifier(s) may be universal identifiers, such as GUIDs. In an exemplary embodiment, analyzing agent 166-176 may have a customer identifier and a unique identifier, although other identifiers are possible. The identifier(s) may allow the data collection and synchronization service 190 to identify which endpoint 102-112 is which in a corporate network. If a particular endpoint 102-112 is turned off or is disconnected from the corporate network (e.g., if a client turns off his or her endpoint 102-112 and/or takes it home to do work), the data collection and synchronization service 190 can determine the last time that the endpoint 102-112 was connected to the network 180. Although there may be differences in each analyzing agent 166-176 depending on the target platform of the endpoint, each analyzing agent 166-176 may have a consistent communication interface and underlying storage, prioritization, and filtering schemes. The analyzing agent 166-176 may share a common format and interface for uploading information to a web service. Exemplary embodiments for these identifiers are further described herein below.

Furthermore, endpoints 102-112 each have a state image 114-124, respectively. The state image 114-124 may comprise state data related to the state and health of the endpoint 102-112. State data may include information such as what is installed on the endpoint 102-112, where it is installed, the password of a particular file, what processes are currently executing, what network connections are currently opening, how much resources are being used, how much memory is free, etc. The state image 114-124 may be stored on the endpoint 102-112 and on the network service side. The service will eventually merge a delta into a state image and then the endpoint 102-112 will do the same. The endpoint 102-112 stores a hash of the state for each uniquely identifiable item included in a data gathering event, which is done to keep the size of the snapshot stored on the endpoint 102-112 as small as possible to reduce the impact on the endpoint 102-112. Exemplary embodiments for hashing in this context are further described herein below and in connection with FIG. 4.

Analyzing agent 166-176 may gather data of the endpoint 102-112, either actively or passively, and compile it into the state image 114-124. For example, analyzing agent 166-176 may gather data actively using a periodic data gathering event. In another embodiment, analyzing agent 166-176 may gather data passively, which may occur when the operating system tells analyzing agent 166-176 that something has changed and analyzing agent 166-176 needs to gather data and/or perform an update.

Once data is gathered, a delta of the state image is sent to a repository 150 within the data collection and synchronization service 190 via various secure, encrypted connections 126-136, respectively. Image transfer may occur when the endpoint 102-112 is connected to the network 180. The repository 150 stores the transferred state images 114-124. A manifest 152 may be provided to analyzing agent 166-176 in the repository 150. In described embodiments, the manifest 152 may be a set of directions or rules specifying what information is to be collected and at what priority and frequency. There can be multiple manifests 152, and a configuration file is used to describe the manifests 152 to download and the frequency at which they should be processed. In an exemplary embodiment, requirements for data collection may include the requirement that first-level filtering must follow the relevant system API. In other embodiments, there may be optional second-level filtering, priorities (e.g., real-time collection priorities, initial data gathering collection priorities, priorities that are collected and sent after the initial collection, etc.), and frequency requirements (i.e., interval for collection), although other requirements are possible. The manifest 152 may be stored in the repository 150 and is delivered to nodes via the network interface 144. Although analyzing agent 166-176 may check for new configuration updates, which indicate if the currently downloaded manifests 152 are still valid and up to date, periodically, analyzing agent 166-176 will deliver what it has rather than trying to respond to a new manifest 152. The endpoint 102-112 will attempt to collect and send state data based on the current manifest 152 and will not block state collection or transmission in order to get an updated manifest 152. There may be an exception, however, for real-time collection priorities. Exemplary embodiments for data collection are further described herein below.

Each state image 114-124 in the repository 150 has associated with it metadata that corresponds to the data of its respective state image 114-124. For example, metadata may include the date and time of the last backup associated with that state image 114-124. The state images 114-124 are synced in the repository 150, which may be done using hashes. Exemplary embodiments for synchronization in the present system are further described herein below.

Once the state image 114-124 has been transferred to the data collection and synchronization service 190, the analyzing agent 166-176 may generate deltas, which represent changes to the system compared to the current state image 114-124 since the previous data gathering event. Deltas require an agreed upon state image version between the endpoint 102-112 and the service 190. When the initial state image 112-124 is transmitted to the data collection and synchronization service 190, if the service 190 and the analyzing agent 166-176 do not agree on the last known state, the analyzing agent 166-176 will delete a local existing state image and will run a data gathering event that will result in a delta that contains the full collectable state. The service 190 must return the same state image identity that the endpoint 102-112 has, otherwise the agent will delete its local state image and will perform a data gathering event that results in rebuilding the state image. Deltas may comprise data to "add," "update," or "delete." Each delta data gathering event on analyzing agent 166-176 starts from the last agreed upon state image identity between the endpoint 102-112 and the service 190 from the server. Delta collections reference which last agreed upon state image identity between the endpoint 102-112 and the service 190 they are reporting from. Exemplary embodiments for delta generation and the use of deltas in the disclosed system are further described herein below and in connection with FIG. 2.

Upon the next data gathering event, deltas may be sent to the repository 150 of the data collection and synchronization service 190 via secure, encrypted connections 126-136. Additionally, there may be a processor unit 156 in the data collection and synchronization service 190. The processor unit 156 may process vulnerability states, pulses, compliance checks, etc., on-demand (i.e., as needed) or in real-time (i.e., as deltas come in). The deltas may be applied to their corresponding state images 114-124 in. Furthermore, any scanning for vulnerabilities must be done against the state image not the delta as the delta may not fully describe an object just an update to an object or part of an object. The deltas are applied by merging them into the existing snapshot or state image on the server. Exemplary embodiments for merging in this context are further described herein below.

Having described the architecture of the data collection and synchronization service 190 and its connections to elements in the disclosed system, including endpoints 102-112, the operation of these elements will be explained in further detail. The endpoint state collection and state transmission to the service 190 include the refinements that provide optimizations in both the size and frequency of collected state that must be stored or transmitted. The endpoint state can be further refined to contain uniquely identifiable items within a given context. A context may include, but is not limited to, registry state, file system state or environment variable state. New contexts can be introduced through a method of updating the endpoint's software.

The first optimization allows an endpoint to store a hash of the per-item identity and a hash of the per-item information in the local endpoint storage as a snapshot of the endpoint state. In order for synchronization to occur, the local endpoint 102-112 needs to store a state image from a data gathering event and must compare the state of the system against the state image upon the next data gathering event. Rather than storing the entire previous state, the disclosed system only stores identity, relationship and state hashes per item within a context. This solution stores the per item identifier in the snapshot stored on the endpoint and reduces the size of the endpoint snapshot and reduce the time needed to perform a delta of the endpoint state by reducing the size of the dataset that must be traversed during the delta process.

The second state collection optimization allows an endpoint to store the parent item identifier hash in the snapshot for items that have a hierarchical context thereby normalizing the dataset and eliminating the need to include the parent item in a delta when a child item has changed. This solution allows delta processing on child items without updating the endpoint state in the service 190 for the entire context and without updating the endpoint state in the service 190 for parent items within the context. Using a hash creates a storage agnostic identifier for an item that is identical on both the endpoint and the network 180. This is different than most storage solutions which have a record identifier that is only valid within a specific storage mechanism. By using a hash value for each item that can be used to identify the item and identify the parent child relationship across a storage boundary, further simplifications can be introduced in the delta generation and merging process. A unique identifier can be derived from every step along the hierarchy from the raw data without consulting the service 190. During the data gathering stage, the endpoint consults with the state image to determine what has changed since the last data gathering event.

The endpoint 102-112 sends a delta for each context to the service 190. The delta contains the per item identity and per item information as well as the type of change to the item such as add, remove, or update. The service 190 merges the endpoint delta into the network 108 copy of the endpoint snapshot. The service 190 stores the information and identity for each item within a given context for processing and analysis. The endpoint merges the local endpoint copy of the delta to the local endpoint copy of the snapshot when the endpoint has confirmed that the service 190 has successfully merged the delta into the service 190 copy of the endpoint snapshot. The process is idempotent, so the same delta may be run against a server snapshot multiple times and it will not end up in a bad state. Once the service 190 and the endpoint 102-112 agree on a state, all subsequent deltas are based off of that last agreed-upon state. For example, an endpoint 102-112 and service 190 may both begin at initial state A. After the endpoint 102-112 performs a data gathering event, it produces a delta B and sends B to the service 190 and the service 190 is supposed to merge B. Before the service 190 is able to merge B, another data gathering event may occur on the endpoint 102-112 and generate delta state C. Once the service 190 has merged C and it's time for the endpoint 102-112 to do another data gathering event, if both the endpoint 102-112 and service 190 agree on state C, the next delta will be based on C.

The present disclosure also provides for the prioritized collection of data using manifests 152. The endpoint 102-112 requests a definition of the state to be collected with the priority it should be collected in the form of state collection rules in a XML document. It should be noted that state collection rules could be implemented in a form other than XML. The state collection rules are partitioned by priority to allow high priority state to be collected separately from lower priority state thereby further reducing the period and size needed to get initial endpoint state. The partitioning of state collection rules could be contained in one document/message or multiple documents/messages. In an embodiment, prioritization may be done by looking at vulnerability signatures. For example, if there is a flight manifest 152 with a list of passengers (i.e., data items within the different contexts) and a certain vulnerability scan is to be run, the first-class passengers will be carried on the first scan and coach passengers will have to take the next flight. In another example, the system might need to check to see whether an endpoint's 102-112 Windows version is up to date, so a data item needs to be collected indicating what Windows version is currently being run. To determine this information, the system will look at the signature and generate a manifest 152 of high priority indicating that data related to what Windows version is being run should be collected, and that it should be collected more frequently as high priority. Thus, the manifest 152 is the mechanism for prioritizing portions of data to virtualize.

The communication for both the state collection rules and the endpoint state is initiated by the endpoint 102-112 to handle cases when the endpoint 102-112 does not have connectivity to the service 190. When the endpoint 102-112 requests a manifest 152 it identifies itself and associated customer/entity information so that the data collection policy specific to that endpoint is returned.

The disclosed embodiments provide various advantages over the prior art. In addition to the advantages previously described, the disclosed system and method manages data for multiple customers. Additionally, analyzing agent is able to attempt to upload changes and check with the data collection and synchronization service 190 when a network connection is available.

Figure 2:
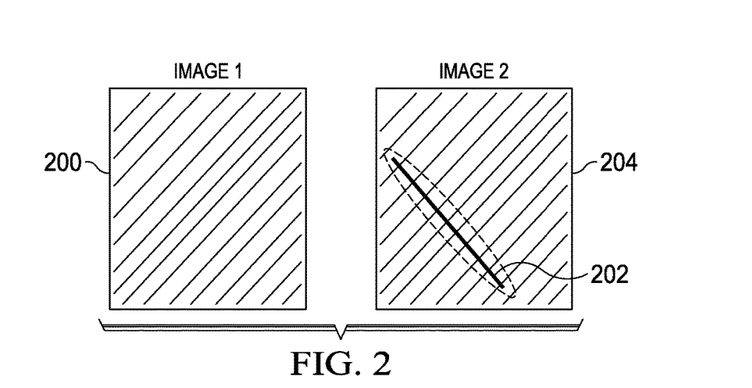
FIG. 2 illustrates the concept of delta generation described in FIG. 1.

FIG. 2 depicts the concept of delta generation described in FIG. 1. State image 200 depicts a state image that is produced upon an initial data gathering event. After changes have been made to the data within the state image, state image 204 is created. State image 204 contains a delta 202 that represents the change made to the data within the state image. Delta 202 is the piece of data that is sent to the repository on data gathering events following the initial data gathering event.

Figure 3:
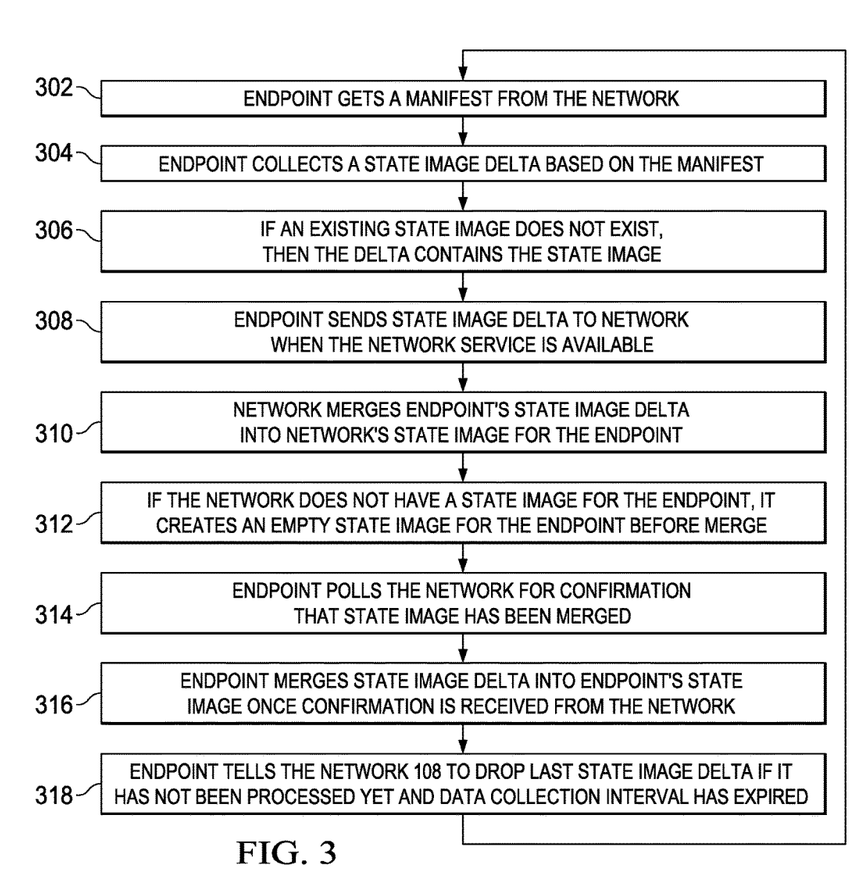
FIG. 3 is a sequence diagram illustrating idempotency of the delta mechanism in accordance with the disclosed principles.

FIG. 3 is a sequence diagram illustrating processing of the delta mechanism in accordance with the disclosed principles. At action 302, endpoint 102-112 gets a manifest 152 from the service 190. At action 304, endpoint 102-112 collects a state image delta based on the manifest 152. At action 306, if an existing state image does not exist, then the delta contains the state image. At action 308, endpoint 102-112 sends state image delta to service 190 when the service 190 is available. At action 310, network 180 merges endpoint's 102-112 state image delta into service 190 state image for the endpoint 102-112. At action 312, if the service 190 does not have a state image for the endpoint 102-112, it creates an empty state image for the endpoint 102-112 before merge. At action 314, endpoint 102-112 polls the service 190 for confirmation that state image has been merged. At action 316, endpoint 102-112 merges state image delta into endpoint's 102-112 state image once confirmation is received from the service 190. At action 318, endpoint 102-112 tells the service 190 to drop last state image delta if it has not been processed yet and data collection interval has expired. The process continues at action 302.

Figure 4:
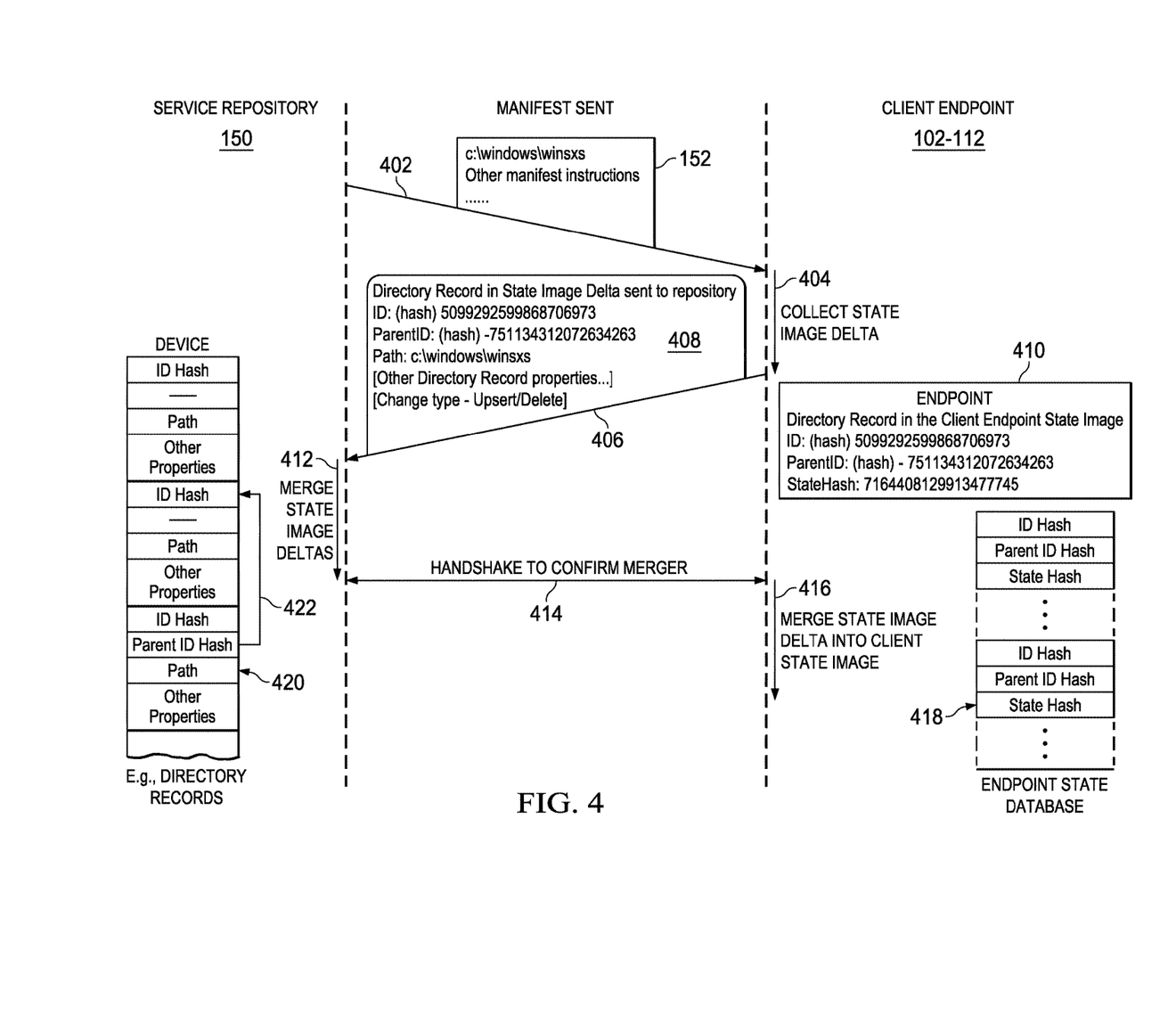
FIG. 4 illustrates sequences and data structures for storing data records and associated hashes in client endpoints and in a data repository of the system.

FIG. 4 illustrates sequences and data structures for storing data records and associated hashes in client endpoint stores 178-186 and in a data repository 156 of the system. In a first action 402 a manifest 152 is sent from the service repository 150 or other associated system elements (e.g., processor unit 156, interface 144) of the data collection and synchronization service 190. The manifest 152 can include a pathname or other location information to identify the area of the client endpoint (e.g., any of 102-112) for which there is state image data to be collected. The manifest 152 can include additional instructions for the client endpoint to use in collecting state data, and the analyzing agent 166-176 for the corresponding endpoint 102-112 would directly or indirectly receive the manifest 152 and process its instructions to collect the state image delta at action 404.

At action 406 the collected state image delta information is sent back to the repository 150 for storage therein. Exemplary data to be included therein is illustrated in the record 408, which shows a matching path to the manifest data (e.g., "c:\windows\winsxs." Also included in the directory record is a hash of the pathname (or other location information) (in this example "50992925998687063"). This hash serves as an identification or "ID" for the data record state image delta being transmitted to and stored in the repository 152. Similarly, as shown in the data record/directory record 410 stored in the client endpoint state image 114-124, this same ID (hash) as transmitted and stored in the repository 152, so accordingly this hashed ID provides correlated data records between the endpoint devices state images 114-124 and the data repository 152.

Still referring to action 406 and the data record 408, the data record 408 also includes a Parent ID hash (in this example, "−751134312072634263"). The Parent ID, where applicable, is a hash of the path of the parent directory for the directory record. Because of the maintenance of this Parent ID hash in the data record 408, there is an automatic relationship maintained and stored for a directory record and its associated parent directory. Because of this, if a parent directory is updated, the subsidiary directory records scan be automatically scanned or have information gathered from them as appropriate without the system needing to know any specific actual information about the path structure—the system can instead depend on the path dependency built out of the respective hash IDs. In the case of a data record 408 for which there is no parent directory, the, corresponding entry for "Parent ID" could be blank or a defined (non-hashed) value that would implicitly identify the directory record as belonging to a root directory element.

With still further reference to the data record 408, other directory properties could be included, and further the change type such as "Upsert" or "Delete." Because of the unique way the state image deltas are organized, as was previously discussed, particularly in discussions relating to FIG. 2 above, but also elsewhere above, the "Upsert" change type is used, as in described embodiments it is not necessary to specifically designate if one of the referenced state image deltas is a "new" entry. Specifically, if the image delta corresponds with a directory ID hash that already exists in the repository, the image delta can be treated as an update to be merged into the repository 152, updating the current record for that ID hash, whereas if the directory ID hash is "new" it can be automatically added to and merged into the repository 152. In either event, that merging is indicated in FIG. 4 as action 412.

During the merging of the state image deltas into the repository 150, there is a "handshake" communications process (action 414) between the endpoint client device (e.g., one of 102-112) and the service repository 150 or other associated system elements (e.g., processor unit 156, interface 144) of the data collection and synchronization service 190. The handshake process 414 is to confirm the merger of the state image deltas 408 into the service repository 150. Once the handshake process 414 is completed, then the state image record 410 is also merged (at step 416) into the corresponding endpoint state image store 178-188. The present embodiment shows directory records, which is a subset of various possible separate state image records stored in accordance with the presently described embodiments. Other state image records that would be stored include but are not limited to registry states, file system states or environment variable states. In the present directory record example, the records stored in the endpoint state image store 178-188 have corresponding ID hashes and Parent ID hashes that match those transmitted to and stored in the repository 152. The illustrated client endpoint data records 418 are also showing in FIG. 4, showing an exemplary organization that shows an ID hash, a Parent ID hash, and a state hash for each directory location. Note that these are abbreviated records relative to the more full corresponding records stored in the repository 152. This is because the client endpoint records 418 may be used solely to reflect the last version of state that was merged into the service repository 152, and if that entry is not updated then it should then be updated, transmitted, and merged as described above in the case of a transmitted manifest 152 requesting the image state for that location.

Still referring to FIG. 4, illustrated there is an exemplary set of repository directory records 420, which in the illustrated example for each record includes an "ID Hash," "Parent ID Hash" (where applicable), "Path" and other properties. Note that the Parent ID hash can be used to establish a directory/subdirectory relationship between such connected records as indicated by the arrow 422 in the figure. As described above, these relationships can be used to efficiently clear out or confirm that updated statuses are needed for child directories (or parent directories) when their corresponding related directory entries are updated.

While various embodiments in accordance with the disclosed principles have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

For example, as referred to herein, the cloud may comprise the security service 190 and the Internet 180. As referred to herein, a machine may be a virtual machine, computer, node, instance, host, or machine in a networked computing environment. Also as referred to herein, a networked computing environment is a collection of machines connected by communication channels that facilitate communications between machines and allow for machines to share resources. Also as referred to herein, a server is a machine deployed to execute a program operating as a socket listener and may include software instances.

Resources may encompass any types of resources for running instances including hardware (such as servers, clients, mainframe computers, networks, network storage, data sources, memory, central processing unit time, scientific instruments, and other computing devices), as well as software, software licenses, available network services, and other non-hardware resources, or a combination thereof.

A networked computing environment may include, but is not limited to, computing grid systems, distributed computing environments, cloud computing environment, etc. Such networked computing environments include hardware and software infrastructures configured to form a virtual organization comprised of multiple resources which may be in geographically disperse locations.

While HTTP communication protocols may be described herein, the coverage of the present application and any patents issuing there from may extend to other local-area network, wide-area network, or other network operating using other communications protocols.

Services and applications are described in this application using those alternative terms. Services can be java services or other instances of operating code. A service/application is a program running on a machine or a cluster of machines in a networked computing environment. Services may be transportable and may be run on multiple machines and/or migrated from one machine to another.

Various terms used herein have special meanings within the present technical field. Whether a particular term should be construed as such a "term of art," depends on the context in which that term is used. "Connected to," "in communication with," or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. A system comprising:
   a) a network interface for communicating over a network with an endpoint device, wherein the endpoint device is intermittently connected to the network;
   b) a repository for storing a state image of the endpoint device, the state image being a last agreed upon stage image between the system and the endpoint device; and
   c) a processor unit in communication with the repository and the endpoint device; wherein the system is configured to:
      provide a manifest to the endpoint device via the network interface, wherein the manifest includes priority and frequency requirements for collecting a state image delta associated with the endpoint device based on the state image of the endpoint device, the state image delta comprising data to add, update, or delete from the state image of the endpoint device;
      receive the state image delta from the endpoint device via the network interface, wherein the state image delta is received when the endpoint device connects to the network;
      merge the state image delta with the state image of the endpoint device in the repository to result in an updated state image, wherein the updated state image is stored in the repository, wherein the system being configured to merge the state image delta with the state image of the endpoint device in the repository comprises the system being configured to:
         determine whether a data collection interval has expired and whether an instruction to drop the state image delta has been processed, and
         in response to determining the data collection interval has expired and the instruction to drop the state image delta has not been processed, the system is configured to merge the state image delta with the state image of the endpoint device in the repository,
      wherein the endpoint device instructs the system to drop a last state image delta if the last state image delta has not been processed and if the data collection interval has expired;
      receive a request for confirmation that the state image delta has been merged with the state image of the endpoint device in the repository from the endpoint device via the network interface; and
      transmit confirmation that the state image delta has been merged with the state image of the endpoint device in the repository to the endpoint device via the network interface, wherein an identifier associated with the state image delta is stored at the endpoint device, and wherein after the confirmation that the state image delta has been merged with the state image of the endpoint device in the repository is received by the endpoint device, the endpoint device merges the state image delta with a second endpoint image stored at the endpoint device.

2. The system of claim 1, and further comprising a scanner in communication with the repository, the scanner configured to analyze at least one of the state image and the updated state image stored in the repository.

3. The system of claim 2, wherein the scanner is configured to determine possible vulnerabilities of the endpoint device based on at least one of the state image and the updated state image without regard to whether the endpoint device is connected to the network at the time of the analysis.

4. The system of claim 1, wherein the identifier identifies a directory record associated with the updated state image in the repository.

5. The system of claim 1, wherein the identifier identifies a parent directory record associated with the updated state image in the repository.

6. The system of claim 1, wherein the identifier identifies state data associated with the endpoint device, wherein the state data is comprised in a directory record associated with the updated state image in the repository.

7. The system of claim 1, wherein the state image in the repository is created in the repository prior to merging the state image delta with the state image in response to determining that no state image associated with the endpoint exists in the repository.

8. The system of claim 1, wherein the state image delta comprises state data associated with the endpoint device, and wherein the state data is collected substantially simultaneously to collecting the state image delta.

9. The system of claim 8, wherein the state data relates to a state and health of the endpoint device and comprises at least one of:
   information indicating what is installed on the endpoint device;
   information indicating a storage location of what is installed on the endpoint device;
   information associated with a password of a particular file stored on the endpoint device;
   information indicating which processes are currently being executed on the endpoint device;
   information associated with the network in communication with the endpoint device; and
   information associated with resource utilization of the endpoint device.

10. The system of claim 1, wherein the processor unit is configured to establish priority requirements for collecting, by the endpoint device, state data associated with the endpoint device, and wherein the priority requirements for collecting state data associated with the endpoint device are comprised in the manifest.

11. The system of claim 1, further comprising an analyzing agent in communication with the network interface, wherein the analyzing agent collects the state image delta associated with the endpoint device based on the manifest.

12. The system of claim 11, wherein the analyzing agent comprises a unique identifier associated with the endpoint device, or wherein the analyzing agent is installed on the endpoint device.

13. The system of claim 11, wherein the analyzing agent comprises an application programming interface associated with the endpoint device.

14. The system of claim 13, wherein the application programming interface serves to identify the endpoint device.

15. A system comprising:
a) a network interface for communicating over a network with an endpoint device;
b) a repository for storing a state image of the endpoint device, the state image being a last agreed upon stage image between the system and the endpoint device;
c) a processor unit in communication with the repository; and
d) an analyzing agent in communication with the network interface, the repository, and the processor unit;
wherein the system is configured to:
provide a manifest to the analyzing agent via the network interface, the manifest including priority and frequency requirements for collecting a state image delta associated with the endpoint device based on the state image of the endpoint device, the state image delta comprising data to add, update, or delete from the state image of the endpoint device;
receive the state image delta from the analyzing agent via the network interface, wherein the state image delta is collected by the analyzing agent;
merge the state image delta with the state image in the repository to result in an updated state image, wherein the updated state image is stored in the repository, wherein the system being configured to merge the state image delta with the state image of the endpoint device in the repository comprises the system being configured to:
determine whether a data collection interval has expired and whether an instruction to drop the state image delta has been processed, and
in response to determining the data collection interval has expired and the instruction to drop the state image delta has not been processed, the system is configured to merge the state image delta with the state image of the endpoint device in the repository,
wherein the endpoint device instructs the system to drop a last state image delta if the last state image delta has not been processed and if the data collection interval has expired;
receive a request for confirmation that the state image delta has been merged with the state image of the endpoint device in the repository from the analyzing agent via the network interface; and
transmit confirmation that the state image delta has been merged with the state image of the endpoint device in the repository to the analyzing agent via the network interface, wherein an identifier associated with the state image delta is stored at the endpoint device, and wherein after the confirmation that the state image delta has been merged with the state image of the endpoint device in the repository is received by the endpoint device, the endpoint device merges the state image delta with a second endpoint image stored at the endpoint device.

16. A system comprising:
a) a network interface for communicating over a network with an endpoint device, wherein the endpoint device is intermittently connected to the network;
b) a repository for storing a state image of the endpoint device; and
c) a processor unit in communication with the repository and with the endpoint device; wherein the system is configured to:
provide a manifest to the endpoint device via the network interface, the manifest including priority and frequency requirements for collecting a state image delta associated with the endpoint device based on the state image of the endpoint device, the state image delta comprising data to add, update, or delete from the state image of the endpoint device in the repository;
receive the state image delta from the endpoint device via the network interface, wherein the state image delta is received when the endpoint device connects to the network;
merge the state image delta with the state image of the endpoint device in the repository to result in an updated state image, wherein the updated state image is stored in the repository, wherein the system being configured to merge the state image delta with the state image of the endpoint device in the repository comprises the system being configured to:
determine whether a data collection interval has expired and whether an instruction to drop the state image delta has been processed, and
in response to determining the data collection interval has expired and the instruction to drop the state image delta has not been processed, the system is configured to merge the state image delta with the state image of the endpoint device in the repository,
wherein the endpoint device instructs the system to drop a last state image delta if the last state image delta has not been processed and if the data collection interval has expired; and
transmit confirmation that the state image delta has been merged with the state image of the endpoint device in the repository to the endpoint device via the network interface, wherein an identifier associated with the state image delta is stored at the endpoint device, and wherein after the confirmation that the state image delta has been merged with the state image of the endpoint device in the repository is received by the endpoint device, the endpoint device merges the state image delta with a second endpoint image stored at the endpoint device.

17. The system of claim 1, wherein the collecting the state image delta comprises generating the state image delta based on collected state data.

18. The system of claim 1, wherein the state image delta is not merged with the second endpoint image stored at the endpoint device at a first time of receiving the state image delta from the endpoint device and at a second time of merging the state image delta with the state image of the endpoint device.

19. The system of claim 1, wherein the confirmation that the state image delta has been merged with the state image of the endpoint device results from a handshake communication between the system and the endpoint device.

* * * * *